United States Patent
Ma et al.

(10) Patent No.: US 11,226,514 B2
(45) Date of Patent: Jan. 18, 2022

(54) DISPLAY PANEL AND DISPLAY DEVICE

(71) Applicant: BOE Technology Group Co., Ltd., Beijing (CN)

(72) Inventors: Sen Ma, Beijing (CN); Qian Wang, Beijing (CN); Zhongxiao Li, Beijing (CN); Qingxun Zhang, Beijing (CN); Wenqing Zhao, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/887,067

(22) Filed: May 29, 2020

(65) Prior Publication Data
US 2021/0096421 A1    Apr. 1, 2021

(30) Foreign Application Priority Data

Sep. 26, 2019    (CN) .......................... 201910921831.5

(51) Int. Cl.
*G02F 1/1335* (2006.01)
*G02F 1/1339* (2006.01)
(Continued)

(52) U.S. Cl.
CPC ..... *G02F 1/133553* (2013.01); *G02B 6/0055* (2013.01); *G02F 1/13394* (2013.01);
(Continued)

(58) Field of Classification Search
CPC ......... G02F 1/133553; G02F 1/133615; G02F 1/133512; G02F 1/1351; G02F 1/13394;
(Continued)

(56) References Cited

U.S. PATENT DOCUMENTS 5,477,351 A * 12/1995 Takahara .............. G02F 1/1334
349/201
2001/0019479 A1* 9/2001 Nakabayashi ....... G02B 6/0055
362/615
(Continued)

FOREIGN PATENT DOCUMENTS

CN    106292051 A  *  1/2017 ....... G02F 1/133615
CN    106569365 A     4/2017
(Continued)

OTHER PUBLICATIONS

First office action of Chinese application No. 201910921831.5 dated Oct. 13, 2021.

*Primary Examiner* — Jia X Pan
(74) *Attorney, Agent, or Firm* — Fay Sharpe LLP

(57) ABSTRACT

A display panel includes a light guide plate, a substrate, a reflector and a liquid crystal layer. A refractive index of the liquid crystal layer can vary between a minimum liquid crystal refractive index and a maximum liquid crystal refractive index. One side, facing the substrate, of the light guide plate includes a light entry region, light at least partially enters the liquid crystal layer through the light entry region and is propagated towards the reflector. The maximum liquid crystal refractive index is greater than a refractive index of the reflector, and the minimum reflective index is not greater than the refractive index of the reflector. When the refractive index of the liquid crystal layer is greater than the reflective index of the reflector, the reflector reflects at least a part of light entering the liquid crystal layer from the light entry region to the light guide plate.

20 Claims, 9 Drawing Sheets

(51) Int. Cl.
 *G02F 1/13357* (2006.01)
 *F21V 8/00* (2006.01)
(52) U.S. Cl.
 CPC .. *G02F 1/133512* (2013.01); *G02F 1/133615* (2013.01); *G02F 1/13398* (2021.01); *G02F 2201/08* (2013.01)
(58) Field of Classification Search
 CPC ............. G02F 1/13398; G02F 2201/08; G02B 6/0031; G02B 6/0055; G02B 6/00; G02B 6/0035; G02B 6/0045
 See application file for complete search history.

(56) References Cited

U.S. PATENT DOCUMENTS

| | | | |
|---|---|---|---|
| 2009/0051848 A1* | 2/2009 | Minoura | G02F 1/1335 349/62 |
| 2009/0086466 A1 | 4/2009 | Sugita et al. | |
| 2014/0300845 A1* | 10/2014 | Tamaki | G02F 1/133514 349/65 |
| 2016/0245984 A1* | 8/2016 | Yu | G02B 6/0055 |
| 2018/0052365 A1 | 2/2018 | Bae et al. | |
| 2019/0011801 A1 | 1/2019 | Komanduri et al. | |
| 2019/0086699 A1* | 3/2019 | Wang | G02F 1/134309 |
| 2019/0121171 A1* | 4/2019 | Tan | G02F 1/133553 |
| 2019/0220124 A1* | 7/2019 | Tan | G06F 3/0421 |
| 2019/0265521 A1 | 8/2019 | Liang et al. | |

FOREIGN PATENT DOCUMENTS

| | | | | |
|---|---|---|---|---|
| CN | 106647093 A | * | 5/2017 | ........... G02B 6/0055 |
| CN | 107765480 A | | 3/2018 | |
| CN | 110262119 A | | 9/2019 | |

\* cited by examiner

DISPLAY PANEL AND DISPLAY DEVICE

CROSS-REFERENCE TO RELATED APPLICATION

This application claims priority to Chinese Patent Application No. 201910921831.5, filed on Sep. 26, 2019, the entire contents of which are incorporated herein by reference

TECHNICAL FIELD

The present disclosure relates to the field of display technology, more particularly, to a display panel and a display device.

BACKGROUND

A liquid crystal display (LCD) has the characteristics of small volume, low power consumption, no radiation, etc., and is a mainstream product of flat-panel display device currently. A liquid crystal display panel is a key device of the liquid crystal display. The liquid crystal display panel is mainly composed of several layers such as a lower polarizer, a thin film transistor array (TFT-Array), a liquid crystal layer, a color light filter membrane, an upper polarizer, etc.

SUMMARY

Embodiments of the present disclosure provide a display panel. The display panel includes: a light guide plate; a substrate, arranged opposite to the light guide plate; a liquid crystal layer, located between the substrate and the light guide plate, wherein a refractive index of the liquid crystal layer can vary between a minimum liquid crystal refractive index and a maximum liquid crystal refractive index; a reflector, located in the liquid crystal layer;
wherein one side, facing the substrate, of the light guide plate includes a light entry region; light propagated in the light guide plate at least partially enters the liquid crystal layer through the light entry region and is propagated towards the reflector; the maximum liquid crystal refractive index of the liquid crystal layer is greater than a refractive index of the reflector, and the minimum reflective index of the liquid crystal layer is not greater than the refractive index of the reflector; and when the refractive index of the liquid crystal layer is greater than the reflective index of the reflector, the reflector reflects at least a part of light entering the liquid crystal layer from the light entry region to the light guide plate.

Embodiments of the present disclosure provide a display device. The display device includes: a display panel according to any one of the aforesaid embodiments and a parallel light source component, the parallel light source component is used for emitting parallel light into the light guide plate, wherein the parallel light is propagated in the light guide plate along a second direction in a total reflection way.

DETAILED DESCRIPTION

Figure 1:
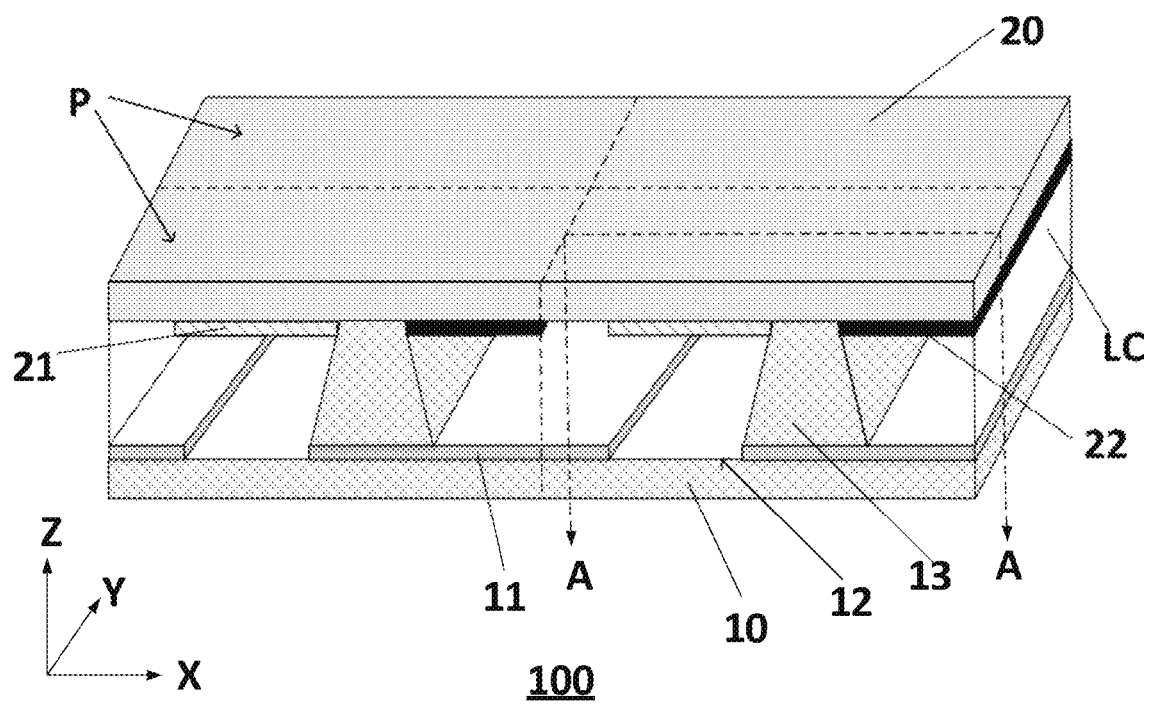
FIG. 1 is a stereostructure schematic diagram of a display device according to some embodiments of the present disclosure.

For clearer descriptions of the objects, technical solutions and advantages in the present disclosure, the present disclosure will be described in detail below with reference to the accompanying drawings. It should be understood that embodiments described below are only for illustration and explanation of the present disclosure, but not for limitation to the present disclosure. In the specification and accompanying drawings, the same or similar drawing symbols refer to the same or similar parts or components. For the sake of clarity, the drawings are not necessarily drawn to scale, and some well-known parts or structures may be omitted from the drawings.

Unless otherwise defined, all technical terms or scientific terms used in the disclosure should be the ordinary meanings understood by a person of ordinary skill in the art to which the disclosure belongs. The "first", "second" and the similar words used in the disclosure do not indicate any order, number or importance, but are only used for distinguishing different components. The word "a" or "an" does not exclude a plurality. Similar words such as "include" or "comprise" mean that elements or objects appearing before the word cover elements or objects and their equivalents listed after the word, but do not exclude other elements or objects. Similar words such as "connected" or "connection" are not limited to a physical or mechanical connection, but may include an electrical connection, whether direct or indirect. "Up", "down", "left", "right", "top" or "bottom" and the like are only used for indicating a relative location relationship. When an absolute location of a described object changes, the relative location relationship may also change accordingly. When a component such as layer, film, region or base substrate, etc. is referred to be located "on" or "below" another component, the component may be "directly" located "on" or "below" another component, or an intermediate component may exist.

The disclosure provides a display panel. The display panel includes: a light guide plate and a substrate which are arranged opposite to each other, a reflector which is arranged between the light guide plate and the substrate, and a liquid crystal layer which is located between the substrate and the light guide plate. A refractive index of the liquid crystal layer can vary between a minimum liquid crystal refractive index and a maximum liquid crystal refractive index. One side, facing the substrate, of the light guide plate includes a light entry region. Light propagated in the light guide plate at least partially enters the liquid crystal layer through the light entry region and is propagated towards the reflector, for example, is propagated towards a side wall (namely an interface between the liquid crystal layer and the reflector), adjacent to the light entry region, of the reflector. The maximum liquid crystal refractive index of the liquid crystal layer is greater than a refractive index of the reflector, and the minimum liquid crystal refractive index of the liquid crystal layer is less than or equal to the refractive index of the reflector. When the refractive index of the liquid crystal layer is greater than the refractive index of the reflector, the reflector reflects at least part of the light entering the liquid crystal layer from the light entry region to the light guide plate, so that the light is emitted from the light guide plate to realize the display of the display panel.

Herein, the refractive index of the liquid crystal layer may be modulated through an electric field, the minimum liquid crystal refractive index of the liquid crystal layer refers to a liquid crystal refractive index when the refractive index is minimum in the modulation process, and the maximum liquid crystal refractive index of the liquid crystal layer refers to a liquid crystal refractive index when the refractive index is maximum in the modulation process.

The display panel can realize the display without a polarizer so that the utilization efficiency of the light is enhanced.

The specific structure and working principle of the display panel in the disclosure will be introduced below with reference to specific embodiments. In the following specific embodiments, the working principle of the display panel can be explained better by taking the refractive index of the light guide plate, the reflector, the liquid crystal layer and the medium layer having a special relationship as an example. Exemplarily, the refractive index of the light guide plate, the refractive index of the reflector and the minimum liquid crystal refractive index are equal and are denoted as a first refractive index $n_1$, and the refractive index of the medium layer is less than the reflective index of the light guide plate and is denoted as $n_2$, so that light entering the light guide plate may be propagated in the light guide plate in a total reflection way, and the maximum liquid crystal refractive index is denoted as $n_3$.

FIG. 1 schematically shows a display structure 100 according to embodiments of the present disclosure. As shown in FIG. 1, the display panel 100 includes a light guide plate 10 and a substrate 20 which are oppositely arranged, and a liquid crystal layer LC which is filled between the light guide plate 10 and the substrate 20. The display panel 100 includes a plurality of pixel regions P which are arranged in an array and in a plane parallel with both a second direction X and a first direction Y, and each pixel region P has the same structure. FIG. 1 only shows four pixel regions P.

Figure 2:
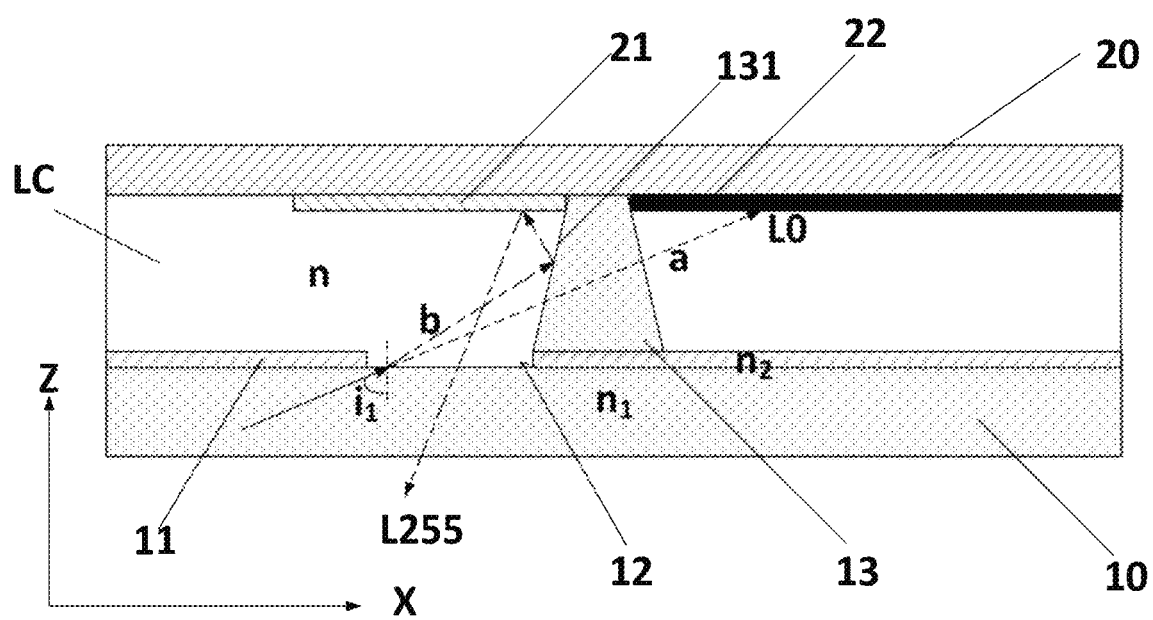
FIG. 2 is a sectional schematic diagram of the display panel in FIG. 1 along a line A-A.

FIG. 2 is a sectional schematic diagram of the display panel in FIG. 1 along a line A-A, that is, it only shows a sectional structure of one pixel region P.

As shown in FIG. 1 and FIG. 2, the light guide plate 10 has a first refractive index $n_1$; a medium layer 11 having a second refractive index $n_2$ is arranged on one side, facing the substrate 20, of the light guide plate 10; the medium layer 11 covers a part of a region of the light guide plate 10, that is, the medium layer 11 is located between the liquid crystal layer LC and the light guide plate 10; a light entry region 12 is arranged in a region, not covered by the medium layer 11, of the light guide plate 10; and the light entry region 12 is configured to allow light propagated in the light guide plate 10 to enter the liquid crystal layer LC through the light entry region 10. A reflector 13 with the first refractive index $n_1$ is arranged on one side, facing the substrate 20, of the medium layer 11; and the reflector 13 is arranged between the medium layer 11 and the substrate 20 and can have a function of supporting to ensure a box thickness uniformity of the display panel. A reflective layer 21 and a light absorption layer 22 are arranged on one side, facing the light guide plate 10, of the substrate 20; and in the second direction X, the reflective layer 21 and the light absorption layer 22 are arranged on two sides of the reflector 13. Exemplarily, the reflective layer 21 and the light entry region 12 are arranged on the same side of the reflector 13, for example the left side as shown in FIG. 2, namely an upstream side of the second direction X; and the light absorption layer 22 is arranged on the other side of the reflector 13, for example the right side as shown in FIG. 2, namely a downstream side of the second direction X (in FIG. 1, the second direction X is from left to right). That is, the upstream side is a first side of the reflector 13, and the first side of the reflector 13 is a side where the reflector 13 receives the light of the light guide plate. The downstream side is a second side of the reflector 13, and the second side of the reflector 13 is a side from which the light of the light guide plate emits after passing through the reflector 13.

In some embodiments, the medium layer 11 is arranged on one side, facing the substrate 20, of the light guide plate 10 and is located on one side, facing the light guide plate 10, of the liquid crystal layer LC and the reflector 13; and the medium layer 11 covers a region on one side, facing the substrate 20, of the light guide plate 10 except the light entry region.

In this embodiment, the reflective layer 20, for example, may be made of a metal material, and an orthographic projection of the reflective layer 21 on the light guide plate 10 is at least partially overlapped with the light entry region on the light guide plate, thereby ensuring that light reflected by the reflector 13 may be incident on the reflective layer 21. The light absorption layer 22 may be made of a light-absorbing material. Each pixel unit P, for example, may include the reflector 13, the light entry region 12 and the reflective layer 21.

In this embodiment, the refractive index n of the liquid crystal layer LC may vary between the first refractive index $n_1$ (which may be referred to as the minimum liquid crystal refractive index) and a third refractive index n3 (which may be referred to as the maximum liquid crystal refractive index), and a relationship among the first refractive index $n_1$, the second refractive index n2 and the third refractive index n3 is: $n_3 > n_1 > n_2$.

In this embodiment, light propagated in the light guide plate 10 may be propagated in the light guide plate 10 along the second direction X as shown in FIG. 2 in a total reflection mode. The refractive index n of the liquid crystal layer LC may vary between the first refractive index $n_1$ and the third refractive index n3, and the relationship among the first refractive index $n_1$, the second refractive index $n_2$ and the third refractive index $n_3$ is: $n_3 > n_1 > n_2$, so one part, entering the liquid crystal layer LC from the light entry region 12, of the light propagated in the light guide plate 10 may vary a light path by adjusting the refractive index of the LC layer and different-grayscale display of the display panel is realized.

Those skilled in the art can understand that the refractive index of the liquid crystal layer LC may be adjusted by adjusting the change of an electric field where the liquid crystal layer LC is located. In this embodiment, each pixel region P of the display panel 100 may include a pixel electrode, a common electrode and a switching element for controlling a voltage of the pixel electrode, such as a thin film transistor. An electric field corresponding to the liquid crystal layer LC in the pixel region P may be changed by controlling a voltage difference between the pixel electrode and the common electrode, so that the state of a corresponding liquid crystal module is changed, and the refractive index n of the liquid crystal layer LC is adjusted. In order to clearly embody the main difference between the display panel in the embodiment and the display panel in related art, FIG. 1 and FIG. 2 do not show the pixel electrode, the common electrode, the switching element, etc.

The working principle of the display panel to display will be described below in details.

Figure 12:
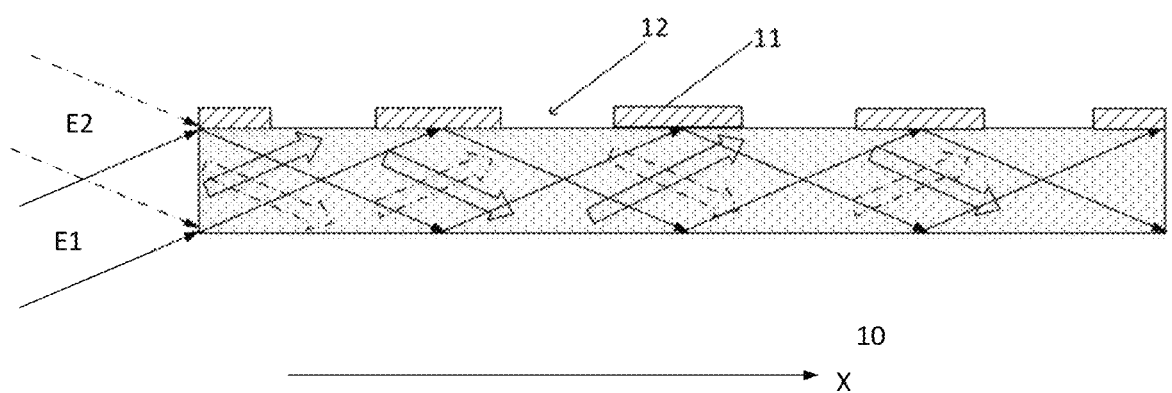
FIG. 12 is a schematic diagram of a propagation path of parallel light generated by the parallel light source component in the light guide plate.

In the embodiments of the present disclosure, the refractive index of the light guide plate 10 is greater than the refractive index of the medium layer 11, so light entering the light guide plate may be propagated in the light guide plate along the second direction X in a total reflection mode, which may refer to FIG. 12. That light may be propagated in the light guide plate along the second direction X refers to, as shown in FIG. 12, light incident in the light guide plate 10 at a preset angle is totally reflected at an upper inner surface (an interface between the light guide plate 10 and the medium layer 11) and a lower inner surface (an interface between the light guide plate and an external environment such as the air) of the light guide plate, and the light is integrally propagated in the light guide plate from left to right along the second direction X. An incidence angle during total reflection of the light is a propagation angle of the light propagated in the light guide plate in a total reflection mode.

As shown in FIG. 2, a part of light propagated in the light guide plate 10 along the second direction X in a total reflection mode may be incident in the liquid crystal layer LC from the light entry region 12 at an incidence angle $i_1$ (namely the propagation angle of the light propagated in the light guide plate 10 in a total reflection mode); when the reflective index n of the liquid crystal layer LC is equal to the first reflective index $n_1$, the reflective index of the light guide plate 10, the liquid crystal layer 10 and the reflector 13 are all the first reflective index $n_1$, so light incident into the liquid crystal layer LC does not deflect, penetrates into the reflector 13 along a first light path a and then is absorbed by the light absorption layer 22, no light is emergent from one side where the light guide plate 10 of the display panel 100 is located at this time, and the pixel region P shown in FIG. 2 is in the darkest state, for example, displaying grayscale L0. When the refractive index n of the liquid crystal layer LC is equal to the third refractive index $n_3$, light incident into the liquid crystal layer LC is refracted, incident into the reflector 13 along a light path b, and reflected to the reflective layer 21 by the reflector 13, and then penetrates into the light guide plate 10 to emit after being reflected by the reflective layer 21, the pixel region P shown in FIG. 2 is in the brightest state at this time, for example, displaying grayscale L255. When the refractive index n of the liquid crystal layer LC changes between the first refractive index $n_1$ and the third refractive index $n_3$, that is $n_3 > n > n_1$, a refraction angle of light incident into the liquid crystal layer LC changes, an incidence angle of light incident into the reflector 13 also changes, and the refractive index of the light incident into the reflector 13 at the interface between the liquid crystal layer LC and the reflector 13 changes accordingly, so modulation of energy for light which is reflected to the reflective layer 21 by the reflector 13 and then emits through the light guide plate 10 after being reflected by the reflective layer can be realized, that is, modulation of display grayscale between L0 and L255 of the pixel region P shown in FIG. 2 is realized. Thereby, grayscale display of the display panel 100 can be realized.

As shown in FIG. 2, a side wall 131, adjacent to the light entry region 12, of the reflector 13 and a thickness direction (namely the third direction Z) of the liquid crystal layer LC forms an angle. By designing the size of the angle, when the reflective index n of the liquid crystal layer is modulated to be the third reflective index $n_3$, an incidence angle of the light incident at the interface between the liquid crystal layer LC and the reflector 13 is just equal to or greater than a total reflection critical angle of the light at the interface, so that for the display grayscale L255, the refractive index of the light at the interface between the liquid crystal layer LC and the reflector 13 is almost 100%. In this way, a maximum light efficiency can be obtained under the angle.

Figure 3:
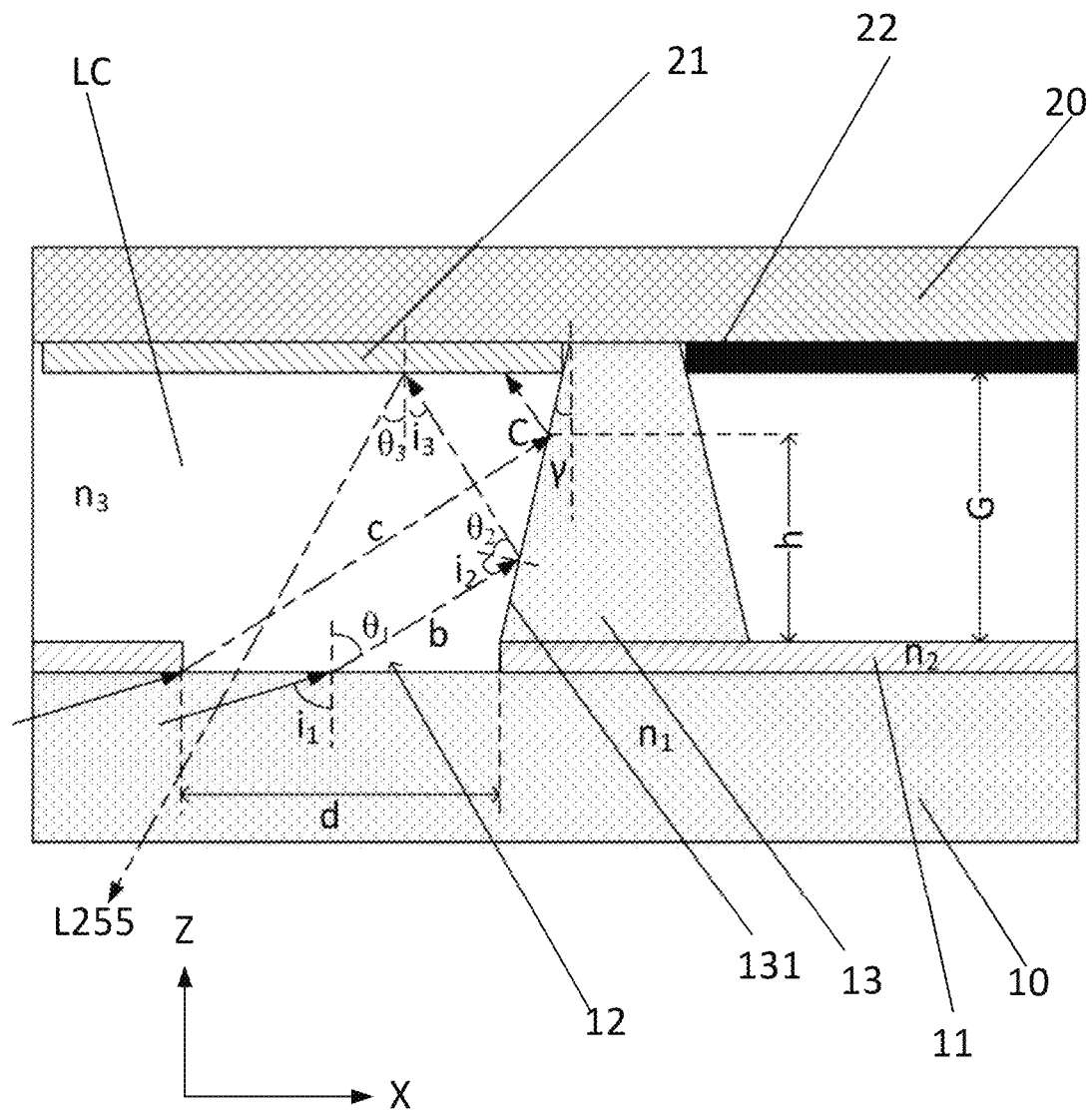
FIG. 3 is an enlarged view of a dashed box region in FIG. 2.

FIG. 3 is a regional enlarged drawing of FIG. 2, wherein it shows a light path b when the display grayscale is 255. As shown in FIG. 3, the side wall 131, adjacent to the light entry region, of the reflector 13 is inclined relative to the second direction X, and an end portion, close to the light guide plate 10, of the side wall is located at the upstream of an end portion, close to the substrate 20, of the side wall in the second direction X.

As shown in FIG. 1 to FIG. 3, the reflector 13 includes two end faces and a side wall which is adjacent to both the light entry region and the reflective layer, and the side wall is connected with the two end faces. That is, the side wall, adjacent to both the light entry region and the reflective layer, of the reflector 13 is inclined relative to the second direction X, and an orthographic projection of the end face, close to the substrate 20, of the reflector 13 on the light guide plate 10 is located in an orthographic projection of the end face, close to the light guide plate 10, of the reflector 13 on the light guide plate 10.

That is, the side wall and the thickness direction of the liquid crystal layer LC forms an angle γ, the light incident to the liquid crystal layer LC from the light guide plate 10 is refracted at the interface of the light guide plate 10 and the liquid crystal layer LC when the display grayscale is 255, the incidence angle is $i_1$, the refraction angle is $\theta_1$, and a relationship between the incidence angle $i_1$ and the refraction angle $\theta_1$ is as shown in a formula (1):

$$\frac{\sin i_1}{\sin \theta_1} = \frac{n_3}{n_1} \qquad (1)$$

The light entering the liquid crystal layer LC is totally reflected at the interface (namely the side wall 131, adjacent to the light entry region, of the reflector 13) of the liquid crystal layer LC and the reflector 13. At the interface of the liquid crystal layer LC and the reflector 13, the incidence angle of the light incident to the reflector 13 is $i_2$ and the reflection angle is $\theta_2$, and $i_2=\theta_2$. After being totally reflected at the interface of the liquid crystal layer LC and the reflector 13, the light is incident to the reflective layer 21. At the interface of the liquid crystal layer LC and the reflective layer 21, the incidence angle of the light incident to the reflective layer 21 is $i_3$, the reflection angle is $\theta_3$, and $i_3=\theta_3$.

As mentioned above, at the interface of the liquid crystal layer LC and the reflector 13, the incidence angle $i_2$ of the light incident to the reflector 13 is a total reflection critical angle of the light incident at the interface of the liquid crystal layer LC and the reflector 13, and may be expressed by a formula (2):

$$i_2 = \arcsin\frac{n_1}{n_3} \quad (2)$$

In addition, according to FIG. 3, it may be determined that the relationship among the angle γ between the side wall 131, adjacent to the light entry region 12, of the reflector 13 and the thickness direction of the liquid crystal layer LC, the incidence angle $i_2$ of the light at the interface of the liquid crystal layer LC and the reflective layer 21, and the refraction angle $\theta_1$ of the light at the interface of the light guide plate 10 and the liquid crystal layer LC is as shown in a formula (3):

$$i_2=(90°-\theta_1)+\gamma \quad (3)$$

Therefore, the following formula (4) may be obtained from the formulas (1) to (3):

$$\gamma = \arcsin\frac{n_1}{n_3} + \arcsin\left(\frac{n_1}{n_3}\cdot\sin i_1\right) - 90° \quad (4)$$

According to the formula (4), the angle γ between the side wall 131, adjacent to the light entry region 12, of the reflector 13 and the thickness direction of the liquid crystal layer LC is related to the incidence angle $i_1$ of the light at the interface of the light guide plate 10 and the liquid crystal layer LC (namely the propagation angle of the light propagated in the light guide plate 10 in a total reflection mode).

It may also be determined from FIG. 3 that the relationship among the reflection angle $\theta_3$ of the light at the interface of the liquid crystal layer LC and the reflective layer 21, the angle γ, and the incidence angle $i_2$ of the light at the interface of the liquid crystal layer LC and the reflective layer 21 is as shown in a formula (5):

$$\theta_3=i_3=(90°-i_2)-\gamma \quad (5)$$

The following formula (6) may be obtained from the formulas (3) to (5):

$$\theta_3 = 180° - 2\cdot\arcsin\frac{n_1}{n_3} - \arcsin\left(\frac{n_1}{n_3}\sin i_1\right) \quad (6)$$

As shown in FIG. 3, the light reflected by the reflective layer 21 passes through the interface of the liquid crystal layer LC and the light guide plate 10 and penetrates into the light guide plate 10 to emit, or passes through the interface of the liquid crystal layer 10 and the medium layer 11 and penetrates into the medium layer 11 and the light guide plate 10 to emit so as to realize display grayscale L255. The incidence angles of the light at the above two interfaces are equal to the reflection angle $\theta_3$ at the interface of the liquid crystal layer LC and the reflective layer 21. It is necessary to ensure that $\theta_3$ is less than the total reflection critical angles of the light at the two interfaces.

Exemplarily, when the light reflected by the reflective layer 21 passes through the interface of the liquid crystal layer LC and the light guide plate 10 and penetrates into the light guide plate 10 to emit, the reflection angle $\theta_3$ needs to meet $$\theta_3 < \arcsin\frac{n_1}{n_3};$$

when the light reflected by the reflective layer 21 passes through the interface of the liquid crystal layer LC and the medium layer 11 and penetrates into the medium layer 11 and the light guide plate 10 to emit, the reflection angle $\theta_3$ needs to meet $$\theta_3 < \arcsin\frac{n_2}{n_3};$$

and because the first reflective index $n_1$ is greater than the second refractive index $n_2$, the reflection angle $\theta_3$ needs to meet $$\theta_3 < \arcsin\frac{n_2}{n_3}$$

to ensure that the display panel can display normally.

In one example, the first refractive index $n_1$ is equal to 1.5, the second refractive index $n_2$ is equal to 1.2 and the third reflection index $n_3$ is equal to 1.8. When the refractive index n of the liquid crystal layer LC is equal to $n_3$, namely 1.8, the light is propagated in the light guide plate in a total reflection mode, and the propagation angle $$i_1 \geq \arcsin\frac{n_2}{n_1} \approx 53°.$$

Figure 4:
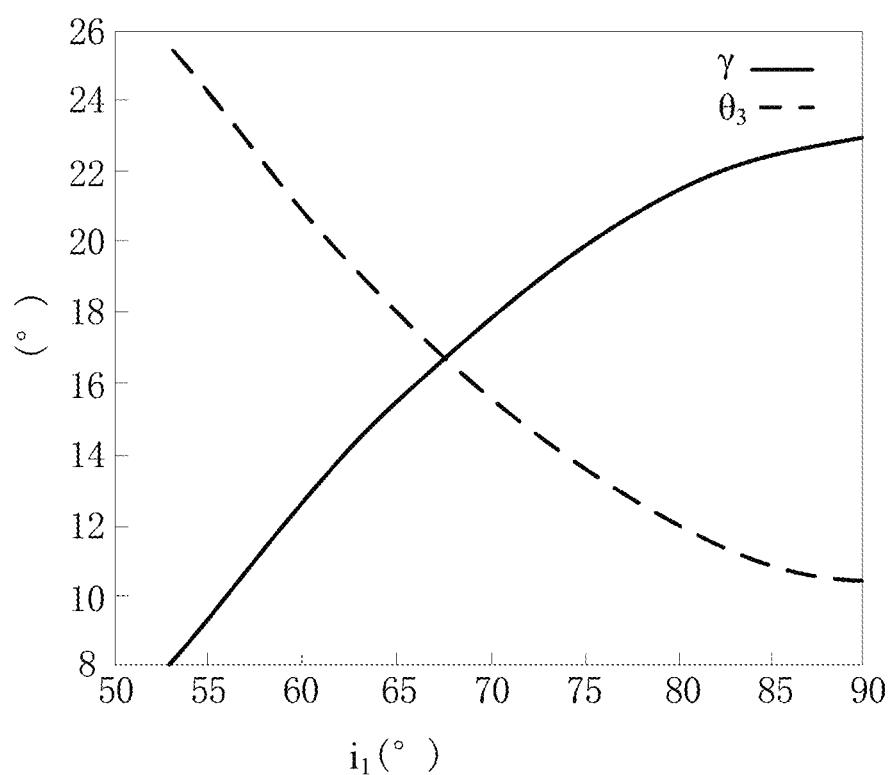
FIG. 4 is a curve graph of a relationship between an angle γ and an incidence angle i1, and a relationship between an emergence angle θ3 and the incidence angle i1.

In a case that $i_1 \in (53°, 90°)$, the relationship between the angle γ the incidence angle $i_1$ and the relationship between the emergency angle θ3 and the incidence angle $i_1$ are as shown in FIG. 4. The relationship between the angle γ and the incidence angle $i_1$ is expressed by a solid-line curve, and the relationship between the emergency angle $\theta_3$ and the incidence angle $i_1$ is expressed by a dotted-line curve. It can be seen from FIG. 4 that when the emergency angle $\theta_3$ is less than 26 degrees, which meets $$\theta_3 < \arcsin\frac{n_2}{n_3} \approx 41.8°,$$

the light can emit and the display panel 100 may realize a normal display.

Those skilled in the art can understand that the smaller the liquid crystal box thickness is, the higher the response speed of the display panel is, and the lower the manufacturing cost is. In the embodiment, as shown in FIG. 3, when the display panel 100 displays the grayscale 255, light incident at the leftmost end of the light entry region 12 is incident to the liquid crystal layer LC in a light path c and is incident at a position C of the interface of the liquid crystal layer LC and the reflector 13. In order to enable the display panel 100 to obtain the maximum light efficiency, the box thickness G of the liquid crystal layer needs to ensure that the light incident from the light entry region 12 in the L255 state can all be reflected by the reflector, and the thickness G of the liquid crystal layer is greater than or equal to a distance h between the position C and the bottom of the liquid crystal layer LC in the thickness direction of the liquid crystal layer, that is G≥h. The distance h and a size d of the light entry region 12 in the second direction X have the following relationship:

$$h \approx d/(\tan \theta_1 - \tan \gamma) \quad (7)$$

Figure 5:
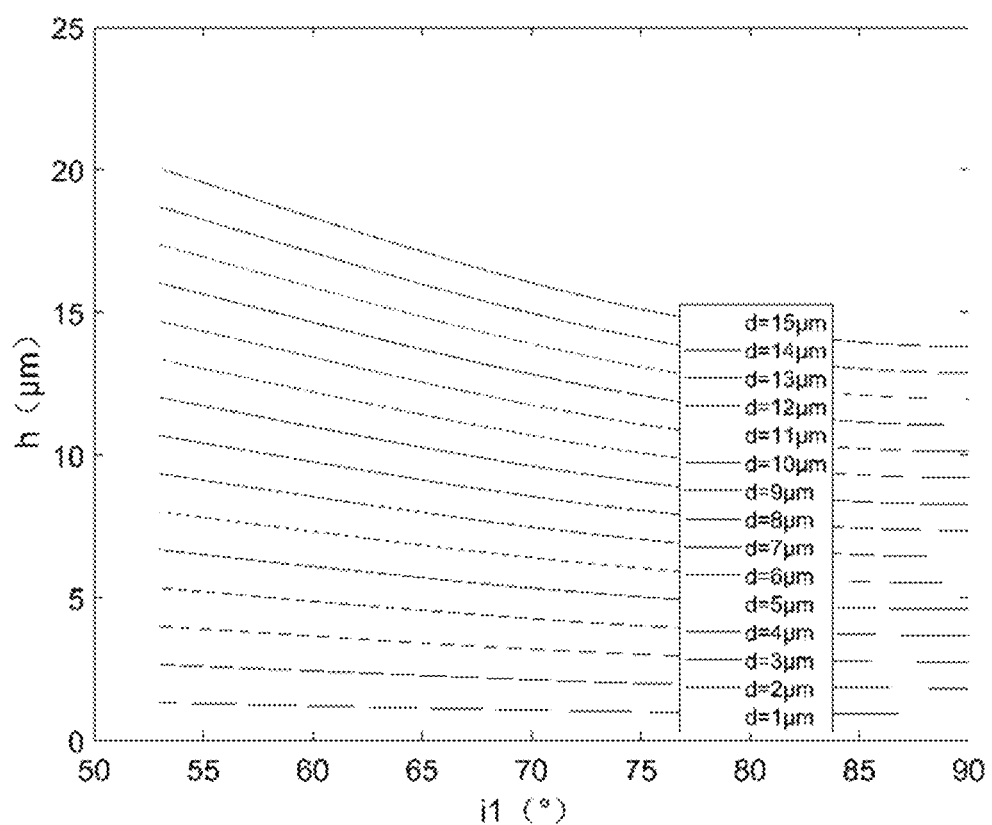
FIG. 5 is a graph of a relationship among an incidence angle $i_1$ and sizes d and h.

In the embodiments of the present disclosure, the minimum value of the thickness G (namely the liquid crystal box thickness) of the liquid crystal layer is h, and FIG. 5 shows the size of the h corresponding to different incidence angles $i_1$ and difference sizes d, that is the minimum liquid crystal box thickness under various conditions.

In the embodiment, derivation and calculation of the formulas are based on the condition that the light, the reflector, the liquid crystal layer and the medium layer have a specific relationship, that is, the reflective index of the light guide plate, the refractive index of the reflector and the minimum liquid crystal refractive index are equal, and the refractive index of the medium layer is less than the refractive index of the light guide plate. However, other embodiments of the present disclosure are not limited to this, as long as display based on the display distance can be realized. For example, in some embodiments, it is only necessary to ensure that the maximum liquid crystal refractive index of the liquid crystal layer is greater than the refractive index of the reflector and the minimum liquid crystal refractive index of the liquid crystal layer is less than or equal to the refractive index of the reflector, and the refractive index of the liquid guide plate is greater than the refractive index of the medium layer and the refractive index of the light guide plate is less than or equal to the minimum refractive index of the liquid crystal layer.

In the above embodiments, description is conducted by taking the condition that the reflective index of the light guide plate 10 is equal to the reflective index of the reflector 13 as an example, but the embodiments of the present disclosure are not limited to this. For example, the refractive index of the light guide plate 10 may be different from the reflective index of the reflector 13, as long as it can ensure that the needed transmission and reflection of the incident light on the side wall of the reflector 13 can be realized. In the embodiments of the present disclosure, the medium layer 11 may cover a region on one side, facing the substrate, of the light guide plate except the light entry region 12.

In the embodiment, as shown in FIG. 2, the light entry region 12 is adjacent to the reflector 13 in the second direction X, and thus the size of the light entry region 12 in the second direction may be as large as possible, light may enter the liquid crystal layer LC and be incident to the reflector 13 as much as possible, and the light efficiency of the display panel 100 may be as high as possible.

In other embodiments, a preset distance may exist between the light entry region 12 and the reflector 13 in the second direction X so as to ensure that the light entering the liquid crystal layer LC from the light entry region 12 can be incident to the reflector 13 and reflected at the interface of the liquid crystal layer LC and the reflector 13.

In the embodiment, as shown in FIG. 2, the reflective layer 21, the reflector 13 and the light absorption layer 22 are adjacent to one another sequentially in the second direction X, so that basically all of the light reflected by the reflector 13 is incident to the reflective layer 21 and is reflected by the reflective layer 21, the light efficiency of the display panel 100 is improved. Basically all of the light transmitted by the reflector 13 is absorbed by the light absorption layer 22, and a good dark display, namely display grayscale L0, of the display panel is ensured.

In other embodiments, in the second direction X, a preset distance may exist between the reflective layer 21 and the reflector 12, and between the reflector 13 and the light absorption layer 22, as long as most of the light reflected by the reflector 13 may be incident to the reflective layer 21 and be reflected by the reflective layer 21, and most of the light transmitted by the reflector 13 is absorbed by the light absorption layer 22.

In some embodiments, the light absorption layer 22 is not necessary and may be omitted in some cases, where the light transmitted by the reflector 13 may penetrate into the light crystal layer LC and the substrate 20 to emit.

In the embodiment, as shown in FIG. 2, a section of the reflector 13 may be trapezoid, such as an isosceles trapezoid. In other embodiments, a section of the reflector 13 may be of other shapes, as long as the side wall 131, adjacent to the light entry region 12, of the reflector 13 and the thickness direction of the liquid crystal layer form the angle γ.

Examplarily, the reflector 13 may be a prism frustum, as shown in FIG. 1, the prism frustum-shaped reflector 13 includes upper and lower end faces, and four side walls for connecting the upper and lower end faces, and the side wall adjacent to both the light entry region and the reflective layer mentioned above is one of the four side walls. Of course, the reflector 13 further may be other shapes, as long as the functions of the reflector described above may be realized.

Figure 6:
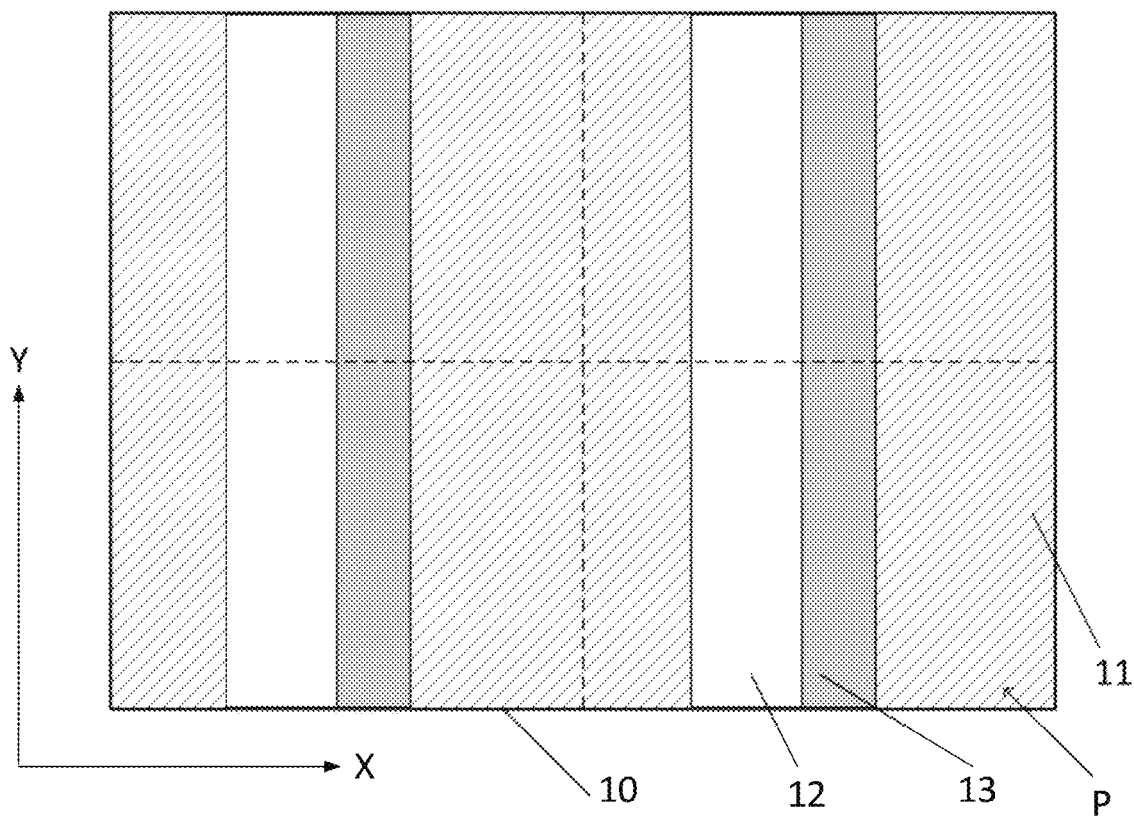
FIG. 6 is a plane schematic diagram showing one example of a light guide plate of the display panel in FIG. 1, and the light guide plate is provided with a medium layer, a light entry region and a reflector.

FIG. 6 is a plane schematic diagram of the light guide plate of the display panel in FIG. 1, and the medium layer 11, the light entry region 12 and the reflector 13 are arranged on the light guide plate 10. Referring to FIGS. 1, 2 and 5, the pixel regions P are arranged along the second direction X and the first direction Y in an array, the reflector 13 runs through one column of pixel regions P arranged along the first direction Y. Similarly, the light entry region 12 also runs through one column of pixel regions P arranged along the first direction Y. In this way, it is conducive to the formation of the light entry region 12 and the reflector 13 on the light guide plate 10, and the process is relatively simple.

Figure 7:
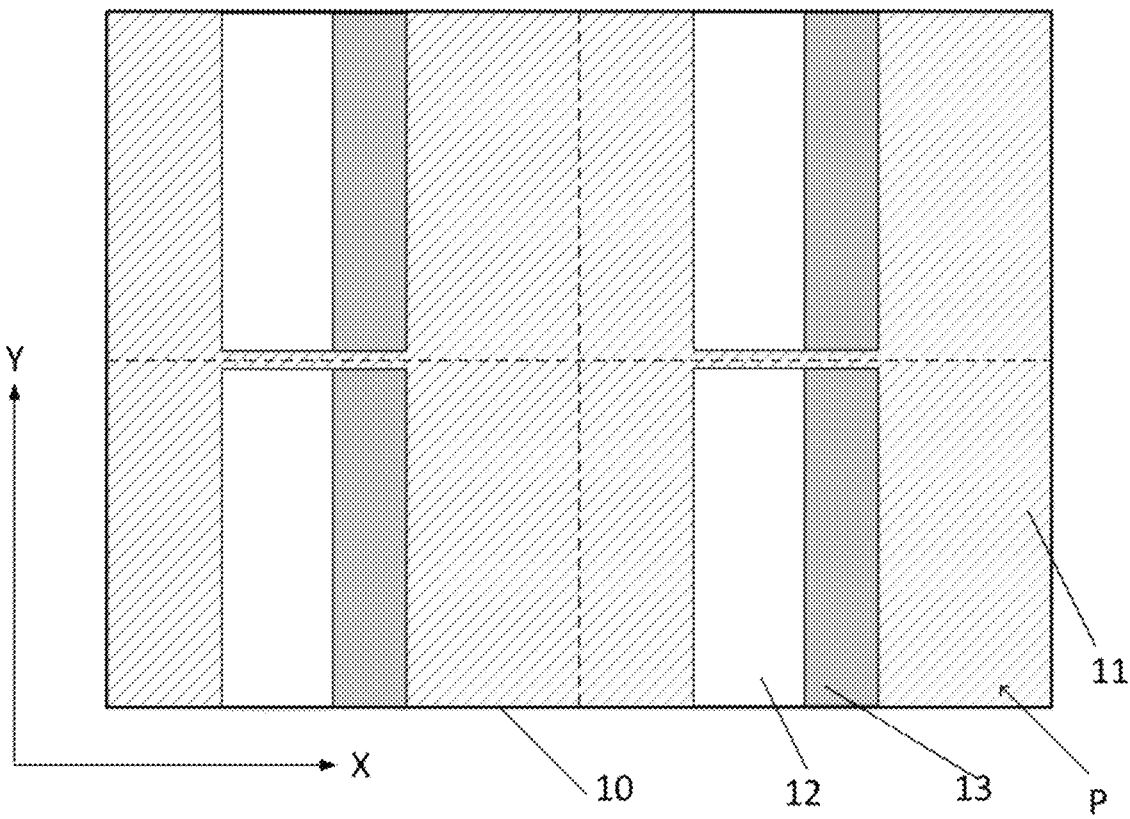
FIG. 7 is a plane schematic diagram of another example of the light guide plate of the display panel in FIG. 1, and the light guide plate is provided with a medium layer, a light entry region and a reflector.

In other embodiments, FIG. 7 is a plane schematic diagram of the light guide plate of the display panel in FIG. 1, and a medium layer 11, a light entry region 12 and a reflector 13 are arranged on the light guide plate 10. The difference between the embodiment in FIG. 7 and the embodiment in FIG. 6 is that one light entry region 12 and one reflector 13 are arranged in each pixel region P. In the first direction Y, the light entry regions 12 in the adjacent pixel regions P are spaced apart from each other, and the reflectors 13 in the adjacent pixel regions P are spaced apart from each other.

Figure 8:
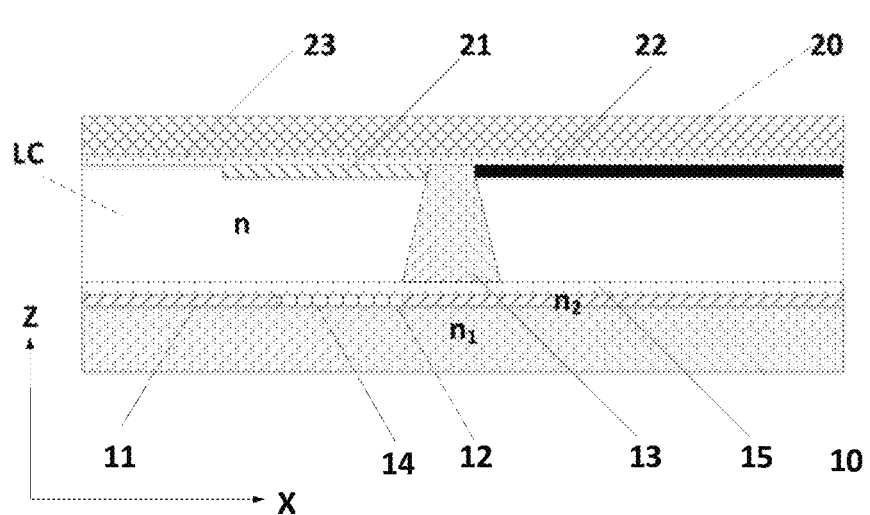
FIG. 8 is a sectional schematic diagram of a pixel region of a display panel according to embodiments of the present disclosure.

A sectional schematic diagram of the pixel region of the display panel provided by some embodiments of the present disclosure is as shown in FIG. 8, the structure is similar to that in the above embodiments. The difference between the embodiment in FIG. 8 and the above embodiments will be mainly described below: the display panel 100 further includes a filling layer 14 filled in the light entry region 12, and the filling layer 14 has a first refractive index n1. In the embodiment, a medium material layer may be formed on the whole upper surface of the light guide plate 10 and then is patterned to form a medium layer 11. The light guide plate is exposed at a region where the medium material layer is removed to form the light entry region 12. A region in which the light entry region 12 is located is filled with a filling material to form the filling layer 14. A thickness of the filling layer 14 may be as same as a thickness of the medium layer 11, so that a process for forming other layers on the medium layer 11 and the filling layer is facilitated.

In some embodiments, as shown in FIG. 1 and FIG. 6, the display panel may include multiple columns of pixel regions, each column of pixel regions includes a plurality of pixel regions P arranged along the first direction Y, the first direction Y is vertical to the thickness direction (namely a third direction Z) of the liquid crystal layer and is vertical to the second direction X, and the reflectors 13 in all the pixel regions P in each column of pixel regions are connected integrally. However, in other embodiments, as shown in FIG. 7, the reflectors 13 in the adjacent pixel regions P are separated from each other.

As shown in FIG. 8, the display panel 100 further includes a pixel electrode 23 and a common electrode 15. The pixel electrode 23 is arranged on one side, facing the light guide plate 10, of the substrate 20. For example, the pixel electrode 23 may be arranged between the substrate 20 and a combination formed by the reflective layer 21 and the light absorption layer 22. The common electrode 15 is arranged on one side, facing the substrate 20, of the light guide plate 10. For example, the common electrode 15 may be arranged on one side, away from the light guide plate 10, of a combination body formed by the medium layer 11 and the filling layer 14. An electric field corresponding to the liquid crystal layer LC in the pixel electrode P may be changed by applying a voltage to the pixel electrode 23 and the common electrode 15 and controlling a voltage difference between the pixel electrode 23 and the common electrode 15, so that a state of a corresponding liquid crystal molecule is changed, and thus the refractive index n of the liquid crystal layer LC is adjusted and display of the display panel 100 is realized.

The embodiment shown in FIG. 8 uses a liquid crystal display structure of a TN mode or a VA mode a. Those skilled in the art may understand that liquid crystal structures of an IPS mode, an FFS mode and an ADS mode may also be used, which is not limited herein.

Figure 9:
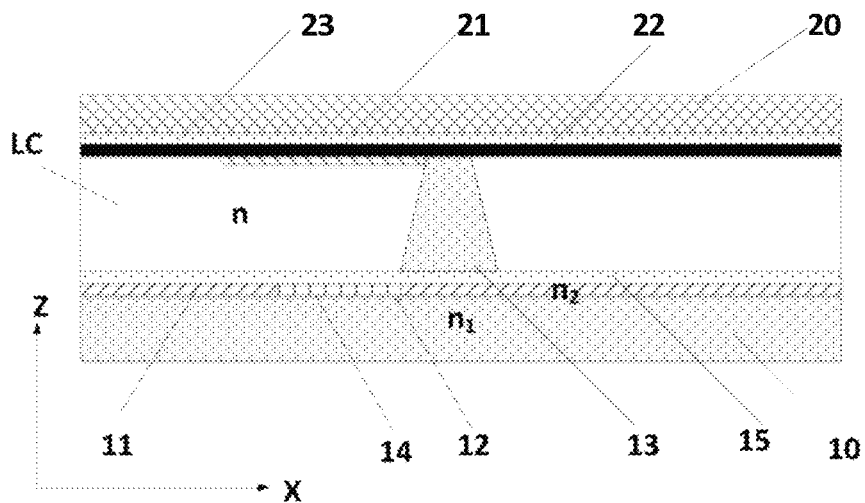
FIG. 9 is a sectional schematic diagram of a pixel region of another display panel according to embodiments of the present disclosure.

A sectional schematic diagram of a pixel region of another display panel provided by some embodiments of the present disclosure is as shown in FIG. 9, the structure is similar to that in the embodiment shown in FIG. 8. The difference between the embodiment in FIG. 9 and other embodiments will be mainly described below: in the embodiment in FIG. 9, the light absorption layer 22 is arranged on a whole surface of one side, facing the light guide plate 10, of the substrate 20, and the reflective layer 21 is arranged on one side, facing the light guide plate 10, of the light absorption layer 22. In this embodiment, the light absorption layer 22 entirely covers the substrate 20, so influence on the display panel 100 by external light is reduced.

Figure 10:
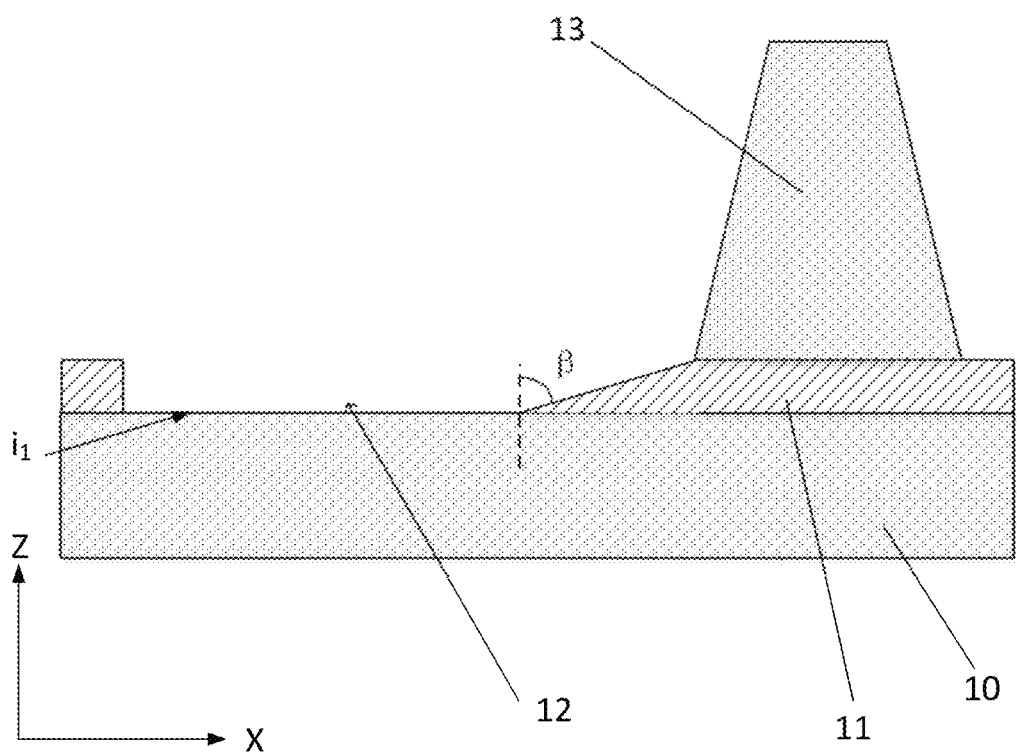
FIG. 10 is a sectional schematic diagram of a light entry region, and a medium layer and a reflector at the periphery of the light entry region according to embodiments of the present disclosure.

In the above embodiments, as shown in FIGS. 3, 7 and 8, a section of the light entry region 12 is rectangular, but the present disclosure is not limited thereto, and in some embodiments, the section of the light entry region 12 may be other shapes. FIG. 10 is a schematic sectional diagram of a light entry region according to embodiments of the present disclosure. As shown in FIG. 10, the section of the light entry region 12 is an inverted trapezoid; a side surface, adjacent to both the light entry region 12 and the reflector 13, of the medium layer 11 is inclined relative to the second direction X; and an angle θ between the side surface and the thickness direction of the liquid crystal layer is greater than or equal to an incidence angle $i_1$, that is $\beta \geq i_1$. With this arrangement, it can be ensured that light entering the liquid crystal layer LC from the light entry region 12 is not incident to an inner side wall of the light entry region 12 to be refracted and change the propagation route of a light path.

Figure 11:
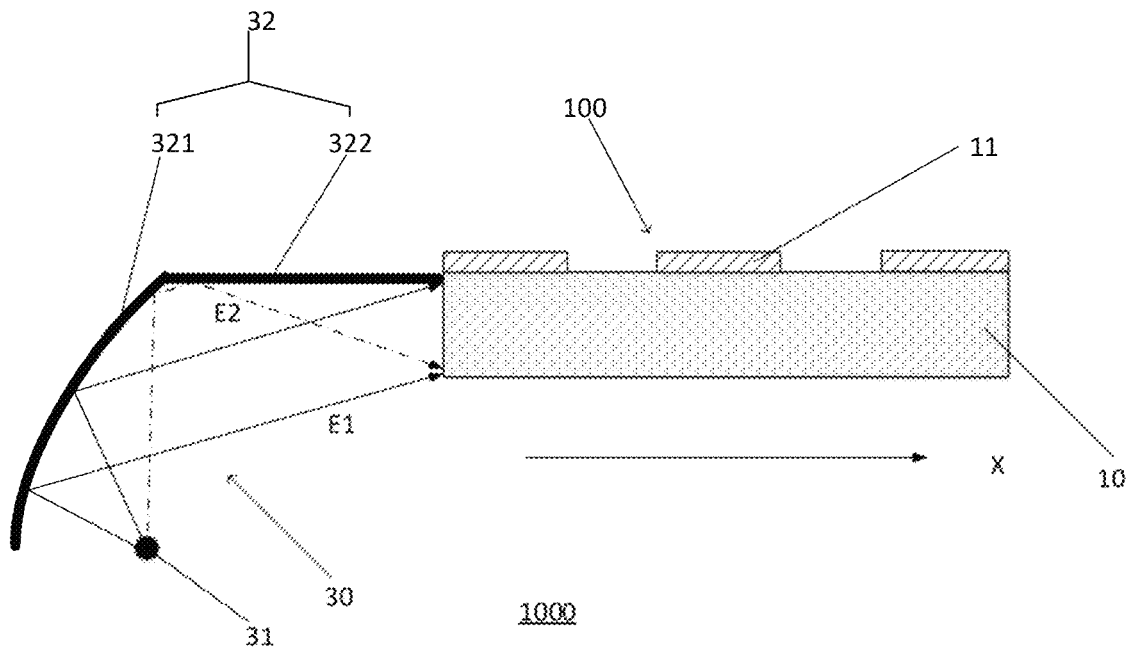
FIG. 11 is a sectional schematic diagram of a display device according to embodiments of the present disclosure, wherein it only shows a light guide plate, a medium layer on the light guide plate, and a parallel light source component.

Some embodiments of the invention provide a display device, including the display panel 100 in the above embodiments, and a parallel light source component for providing parallel light to the light guide plate in the display panel 100. FIG. 11 is a sectional schematic diagram of a display device according to embodiments of the present disclosure, and it only shows a light guide plate, a medium layer on the light guide plate, and a parallel light source component. As shown in FIG. 11, in the display device 1000, the parallel light source component 30 is located on an upstream side of the light guide plate 10 in the second direction X, and is used for emitting parallel light and enabling the parallel light to enter into the light guide plate from the upstream side of the light guide plate in the second direction X and perform the total reflection propagation in the light guide plate 10 in the second direction X. As shown in FIG. 11, the parallel light source component 30 includes a light source 31 and a light source cover 32. In some embodiments, the light source cover 32 includes a reflective curved surface 321, for example a paraboloidal reflective surface. A section intercepted from a plane parallel with the second direction X and the thickness direction (namely a third direction Z) of the liquid crystal layer is paraboloidal. The light source 31 is arranged at a focal point of the reflective curved surface 321, so that light emitted by the light source 31 is incident to the reflective curved surface and is reflected by the reflective curved surface 321 to form parallel light to emit. The parallel light may be incident into the light guide plate 10 from a left side surface of the light guide plate 10 by adjusting a position relationship between the parallel light source component 30 and the light guide plate 10 so as to perform the total reflection propagation in the light guide plate 10 at an propagation angle i1 and along the second direction X. Thus, light required for display of the display panel 100 in the display device 1000 is provided.

As shown in FIG. 11, the light source cover 32 further includes a reflective plane 322. One end of the reflective plane 322 is at least connected to the reflective curved surface 321, and the other end of the reflective plane 322 extends towards the light guide plate 10 along the second direction X, so the parallel light source component may generate first parallel light E1 and second parallel light E2, and the first parallel light E1 is formed through the reflection of the reflective curved surface 321, and the second parallel light E2 is formed by the reflection of the reflective curved surface 321 first and then by the reflection of the reflective plane 322. Emergence directions of the first parallel light E1 and the second parallel light E2 are symmetrical relative to the second direction X. In some embodiments, the reflective plane 322 is arranged between the reflective curved surface 321 and the light guide plate 10 and is connected with the reflective curved surface 321, and the reflective plane 322 is vertical to the thickness direction of the liquid crystal layer.

FIG. 12 shows a propagation path of two parallel light in the light guide plate 10. As shown in FIG. 12, the first parallel light E1 is propagated in the light guide plate 10 in a total reflection mode and along a path indicated by a solid line arrow box, can only arrive at positions where odd-numbered light entry regions 12 are located, but cannot arrive at positions where even-numbered light entry regions 12 are located. The second parallel light E2 is propagated in the light guide plate 10 in a total reflection mode and along a path indicated by a dotted line arrow box, can only arrive at positions where even-numbered light entry regions 12 are located, but cannot arrive at positions where odd-numbered light entry regions 12 are located.

In the embodiment, through the light source cover including the reflective curved surface 321 and the reflective plane 322, the first parallel light E1 and the second parallel light E2 may be generated simultaneously, and the two parallel light are coupled mutually at a mutually symmetrical angle to enter the light guide plate 10 and are propagated in the light guide plate in the total reflection mode, so that all the light entry regions 12 may be irradiated by the first parallel light E1 or the second parallel light E2, and it can be ensured that each pixel region P in the display panel 100 may be lightened.

In the embodiment, the parallel light source component 30 extends along the first direction Y vertical to the second direction X, and a length of the parallel light source component 30 in the first direction Y is as same as a size of the light guide plate 10 in the first direction Y, so that the parallel light generated by the parallel light source component 30 can irradiate and enter the whole side surface, facing the parallel light source component 30, of the light guide plate, and thus normal display of the display device 100 is ensured.

In some embodiments, the parallel light source component 30 may be a combination of a plurality of parallel light source units, the plurality of parallel light source units are arranged sequentially in the first direction Y; a section of each parallel light source unit has a sectional structure of the parallel light source component 30 shown in FIG. 11; and a light source in each parallel light source unit may be a point light source.

In the above embodiments, the parallel light source component 30 outputs parallel light through cooperation of the light source and the reflective curved surface, which is not limited in the present disclosure. In other embodiments, the parallel light source component may further output parallel light through cooperation of the light source and a lens, etc.

In some embodiments, the display device according to the present disclosure may be any products or parts with a display function, such as a television, a display, a digital photo frame, a mobile phone, a smartwatch, a tablet personal computer, etc.

The present disclosure has been described with reference to the accompanying drawings, but the embodiments disclosed in the drawings are intended to exemplarily illustrate the embodiments of the present disclosure, and should not be understood as a limitation to the present disclosure. The dimension scale in the drawings is only exemplary and should not be understood as a limitation to the present disclosure.

The above embodiments only exemplarily illustrate the principle and construction of the present disclosure, but are not used for limiting the present disclosure. Those skilled in the art should understand that any changes and improvements on the present disclosure are within the scope of the present disclosure without departing from the general concept of the present disclosure. The protection scope of the present disclosure should be based on the scope defined by the claims of the present application.

The invention claimed is:

1. A display panel, comprising:
 a light guide plate;
 a substrate, arranged opposite to the light guide plate;
 a liquid crystal layer, located between the substrate and the light guide plate,
 wherein a refractive index of the liquid crystal layer can vary between a minimum liquid crystal refractive index and a maximum liquid crystal refractive index;
 a reflector, located in the liquid crystal layer;
 wherein one side, facing the substrate, of the light guide plate comprises a light entry region; light propagated in the light guide plate at least partially enters the liquid crystal layer through the light entry region and is propagated towards the reflector; the maximum liquid crystal refractive index of the liquid crystal layer is greater than a refractive index of the reflector, and the minimum reflective index of the liquid crystal layer is not greater than the refractive index of the reflector; and
 when the refractive index of the liquid crystal layer is greater than the reflective index of the reflector, the reflector reflects at least a part of light entering the liquid crystal layer from the light entry region to the light guide plate, and
 wherein in a case that the refractive index of the liquid crystal layer is the minimum liquid crystal refractive index, light entering the liquid crystal layer from the light entry region is transmitted through the reflector; and in a case that the refractive index of the liquid crystal layer is the maximum liquid crystal refractive index, light entering the liquid crystal layer from the light entry region is totally reflected by the reflector.

2. The display panel according to claim 1, wherein a reflective layer is arranged on one side, facing the light guide plate, of the substrate, and is configured to reflect light reflected by the reflector to the light guide plate.

3. The display panel according to claim 1, further comprising a medium layer located between the liquid crystal layer and the light guide plate, wherein the medium layer covers a region on one side, facing the substrate, of the light guide plate except the light entry region.

4. The display panel according to claim 3, wherein a refractive index of the light guide plate is greater than a refractive index of the medium layer, and the refractive index of the light guide plate less than or equal to the minimum liquid crystal refractive index of the liquid crystal layer.

5. The display panel according to claim 4, wherein the refractive index of the light guide plate is equal to the refractive index of the reflector.

6. The display panel according to claim 2, wherein the display panel comprises a plurality of pixel regions, and the reflector, the light entry region and the reflective layer are arranged in each pixel region.

7. The display panel according to claim 6, wherein reflectors in the adjacent pixel regions are separated from each other.

8. The display panel according to claim 6, wherein the display panel comprises multiple columns of pixel regions; each column of pixel region comprises a plurality of pixel regions arranged along a first direction; and reflectors in all the pixel regions in each column of pixel regions are connected integrally.

9. The display panel according to claim 8, wherein light is propagated in the light guide plate along a second direction and in a total reflection mode, and the second direction is vertical to a thickness direction of the liquid crystal layer and vertical to the first direction.

10. The display panel according to claim 9, wherein in at least one pixel region of the plurality of pixel regions, the light entry region and the reflective layer are located on a first side of the reflector, and the first side of the reflector is a side where the reflector receives the light of the light guide plate.

11. The display panel according to claim 10, wherein in the at least one pixel region, the display panel further comprises:
a light absorption layer, arranged on one side, facing the light guide plate, of the substrate, and located on a second side of the reflector, wherein the second side of the reflector is a side opposite to the first side of the reflector.

12. The display panel according to claim 10, wherein the display panel further comprises a light absorption layer,
wherein the light absorption layer is arranged on one side, facing the light guide plate, of the substrate and covers the whole substrate; and
in the at least one pixel region, the reflective layer is arranged on one side, facing the light guide plate, of the light absorption layer.

13. The display panel according to claim 10, wherein the reflector comprises two end faces and a side wall which is adjacent to both the light entry region and the reflective layer, and the side wall is connected with the two end faces; and
in the at least one pixel region, in the second direction, the side wall is inclined relative to the second direction, and an orthographic projection of the end face, close to the substrate, of the reflector on the light guide plate is located in an orthographic projection of the end face, close to the light guide plate, of the reflector on the light guide plate.

14. The display according to claim 13, wherein both the refractive index of the light guide plate and the refractive index of the reflector are a first refractive index, and an angle between the side wall and the thickness direction of the liquid crystal layer is γ, $$\gamma = \arcsin\frac{n_1}{n_3} + \arcsin\left(\frac{n_1}{n_3} \cdot \sin i_1\right) - 90°,$$

wherein $i_1$ is an incidence angle of the light incident into the liquid crystal layer from the light entry region, $n_1$ is the first refractive index, and $n_3$ is the maximum liquid crystal refractive index of the liquid crystal layer.

15. The display panel according to claim 9, further comprising a medium layer, wherein, the medium layer is located between the liquid crystal layer and the light guide plate, and covers a region on one side, facing the substrate, of the light guide plate except the light entry region;
a side surface, adjacent to both the light entry region and the reflector, of the medium layer is inclined relative to the second direction; and
an orthographic projection of a top surface, close to the reflector, of the medium layer is located in an orthographic projection of a bottom surface, close to the light guide plate, of the medium layer on the light guide plate.

16. The display according to claim 15, wherein an angle between the side surface and the thickness direction of the liquid crystal layer is β, β is greater than or equal to i1, and i1 is an incidence angle of the light incident into the liquid crystal layer from the light entry region.

17. The display panel according to claim 2, wherein an orthographic projection of the reflective layer on the light guide plate is at least partially overlapped with the light entry region.

18. A display device, comprising: a display panel and a parallel light source component, wherein
the display panel comprises:
a light guide plate;
a substrate, arranged opposite to the light guide plate;
a liquid crystal layer, located between the substrate and the light guide plate, wherein a refractive index of the liquid crystal layer can vary between a minimum liquid crystal refractive index and a maximum liquid crystal refractive index; and
a reflector, located in the liquid crystal layer, wherein
one side, facing the substrate, of the light guide plate comprises a light entry region; light propagated in the light guide plate at least partially enters the liquid crystal layer through the light entry region and is propagated towards the reflector; the maximum liquid crystal refractive index of the liquid crystal layer is greater than a refractive index of the reflector, and the minimum reflective index of the liquid crystal layer is not greater than the refractive index of the reflector; and when the refractive index of the liquid crystal layer is greater than the reflective index of the reflector, the reflector reflects at least part of light entering the liquid crystal layer from the light entry region to the light guide plate,
wherein in a case that the refractive index of the liquid crystal layer is the minimum liquid crystal refractive index, light entering the liquid crystal layer from the light entry region is transmitted through the reflector; and in a case that the refractive index of the liquid crystal layer is the maximum liquid crystal refractive index, light entering the liquid crystal layer from the light entry region is totally reflected by the reflector, and
wherein the parallel light source component is used for emitting parallel light into the light guide plate, wherein the parallel light is propagated in the light guide plate along a second direction in a total reflection way.

19. The display device according to claim 18, wherein the parallel light source component comprises:
a light source; and
a light source cover,
wherein the light source cover comprises:
a reflective curved surface, wherein a section of the reflective curved surface intercepted by a plane parallel with the second direction and a thickness direction of the liquid crystal layer is a parabola, and the light source is located at a focal point of the parabola and emits light to the reflective curved surface; and
a reflective plane, arranged between the reflective curved surface and the light guide plate, connected with the reflective curved surface and is vertical to the thickness direction of the liquid crystal layer.

20. A display panel, comprising:
a light guide plate;
a substrate, arranged opposite to the light guide plate;
a liquid crystal layer, located between the substrate and the light guide plate, wherein a refractive index of the liquid crystal layer can vary between a minimum liquid crystal refractive index and a maximum liquid crystal refractive index;
a reflector, located in the liquid crystal layer;
wherein one side, facing the substrate, of the light guide plate comprises a light entry region; light propagated in the light guide plate at least partially enters the liquid crystal layer through the light entry region and is propagated towards the reflector; the maximum liquid crystal refractive index of the liquid crystal layer is greater than a refractive index of the reflector, and the minimum reflective index of the liquid crystal layer is not greater than the refractive index of the reflector; and when the refractive index of the liquid crystal layer is greater than the reflective index of the reflector, the reflector reflects at least a part of light entering the liquid crystal layer from the light entry region to the light guide plate, and a medium layer, located between the liquid crystal layer and the light guide plate, the meduim layer covers a region on one side, facing the substrate, of the light guide plate except the light entry region.

* * * * *